United States Patent
Liu et al.

(10) Patent No.: US 12,014,520 B2
(45) Date of Patent: Jun. 18, 2024

(54) SYSTEMS AND METHODS FOR DETECTING OBJECTS WITHIN AN IMAGE IN A WIDE-VIEW FORMAT

(71) Applicant: Toyota Motor Engineering & Manufacturing North America, Inc., Plano, TX (US)

(72) Inventors: Yongkang Liu, Plano, TX (US); Xuewei Qi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 372 days.

(21) Appl. No.: 17/513,146

(22) Filed: Oct. 28, 2021

(65) Prior Publication Data
US 2023/0077082 A1   Mar. 9, 2023

Related U.S. Application Data

(60) Provisional application No. 63/237,330, filed on Aug. 26, 2021.

(51) Int. Cl.
*G06T 7/73* (2017.01)
*G01C 21/00* (2006.01)
(Continued)

(52) U.S. Cl.
CPC ............ *G06T 7/75* (2017.01); *G01C 21/3807* (2020.08); *G06F 18/214* (2023.01); *G06F 18/24* (2023.01);
(Continued)

(58) Field of Classification Search
None
See application file for complete search history.

(56) References Cited

U.S. PATENT DOCUMENTS

| | | |
|---|---|---|
| 9,437,001 B2 | 9/2016 | Scholl et al. |
| 2013/0058589 A1 | 3/2013 | Chai et al. |

(Continued)

FOREIGN PATENT DOCUMENTS

| | | |
|---|---|---|
| CN | 105407278 A | 3/2016 |
| CN | 111524150 A | 8/2020 |

(Continued)

OTHER PUBLICATIONS

A. Deng et al ("CNN based Semantic Segmentation for Urban Traffic Scenes using Fisheye Camera", 2017 IEEE Intelligent Vehicles Symposium (IV), Jun. 11-14, 2017, DOI: 10.1109/IVS.2017.7995725, pp. 231-236, retrieved from the Internet on Dec. 29, 2023) (Year: 2017).*

(Continued)

*Primary Examiner* — Leon Viet Q Nguyen
(74) *Attorney, Agent, or Firm* — Christopher G. Darrow; DARROW MUSTAFA PC

(57) ABSTRACT

System, methods, and other embodiments detecting and localizing objects within an image in a wide-view format using a synthetic representation. The method includes converting a real image in a wide-view format to a synthetic representation using a style model, wherein the synthetic representation depicts a distorted view of an object. The method also includes identifying features of the object using an extraction model that distinguishes different scales of the synthetic representation and a simulated scene to define structures associated with the distorted view. The method also includes detecting the object using a decoder model that identifies an attribute and a bounding box of the object from the features. The method also includes executing a task (Continued)

using the attribute and the bounding box to localize the object in the simulated scene.

20 Claims, 7 Drawing Sheets

(51) Int. Cl.
*G06F 18/214* (2023.01)
*G06F 18/24* (2023.01)
*G06N 3/045* (2023.01)
*G06T 3/00* (2006.01)
*G06T 3/40* (2006.01)
*G06V 10/22* (2022.01)
*G06V 10/44* (2022.01)
*G06V 10/94* (2022.01)
*G06V 20/56* (2022.01)

(52) U.S. Cl.
CPC ........... *G06N 3/045* (2023.01); *G06T 3/0062* (2013.01); *G06T 3/40* (2013.01); *G06V 10/225* (2022.01); *G06V 10/44* (2022.01); *G06V 10/95* (2022.01); *G06V 20/56* (2022.01); *G06T 2207/20081* (2013.01); *G06T 2207/20084* (2013.01); *G06T 2207/30236* (2013.01); *G06T 2207/30252* (2013.01); *G06V 2201/08* (2022.01)

(56) References Cited

U.S. PATENT DOCUMENTS

| | | | |
|---|---|---|---|
| 2018/0330176 A1 | 11/2018 | Kumar et al. | |
| 2020/0160106 A1* | 5/2020 | Sivalingam | G06F 18/214 |
| 2020/0175311 A1 | 6/2020 | Xu et al. | |
| 2022/0284236 A1* | 9/2022 | Misraa | G06V 10/26 |

FOREIGN PATENT DOCUMENTS

| | | |
|---|---|---|
| CN | 113159043 A | 7/2021 |
| EP | 3832341 A1 | 6/2021 |
| WO | 2019205842 A1 | 10/2019 |

OTHER PUBLICATIONS

Bansal et al., "Recycle-gan: Unsupervised video retargeting." In Proceedings of the European conference on computer vision (ECCV), 2018, pp. 119-135.

Zhu et al., "Unpaired image-toimage translation using cycle-consistent adversarial networks." In Proceedings of the IEEE international conference on computer vision, 2017, pp. 2223-2232.

Huang et al., "Multimodal unsupervised image-to-image translation," In Proceedings of the European conference on computer vision (ECCV) 2018, pp. 172-189.

Rashed et al., "FisheyeYOLO: Object Detection on Fisheye Cameras for Autonomous Driving" Machine Learning for Autonomous Driving Workshop at the 34th Conference on Neural Information Processing Systems, NeurIPS 2020, Vancouver, Canada, pp. 1-5.

Zhao et al., "Reprojection R-CNN: A Fast and Accurate Object Detector for 360° Images," arXiv:1907.11830, Jul. 27, 2019, pp. 1-10.

Scheck et al., "Learning from Theodore: A Synthetic Omnidirectional Top-View Indoor Dataset for Deep Transfer Learning," Proceedings of the IEEE/CVF Winter Conference on Applications of Computer Vision (WACV), 2020, pp. 943-952.

Xue et al., "Fisheye Distortion Rectification from Deep Straight Lines," arXiv:2003.11386, Mar. 25, 2020, pp. 1-14.

Plaut et al., "3D Object Detection from a Single Fisheye Image Without a Single Fisheye Training Image," Proceedings of the IEEE/CVF Conference on Computer Vision and Pattern Recognition (CVPR) Workshops, 2021, pp. 3659-3667.

Jonathan Hui, "Understanding Feature Pyramid Networks for object detection (FPN)," Mar. 27, 2018, 11 pages, found at https://jonathan-hui.medium.com/understanding-feature-pyramid-networks-for-object-detection-fpn-45b227b9106c.

* cited by examiner

SYSTEMS AND METHODS FOR DETECTING OBJECTS WITHIN AN IMAGE IN A WIDE-VIEW FORMAT

CROSS-REFERENCE TO RELATED APPLICATIONS

This application claims the benefit of U.S. Provisional Application No. 63/237,330, filed on Aug. 26, 2021, which is herein incorporated by reference in its entirety.

TECHNICAL FIELD

The subject matter described herein relates, in general, to detecting objects within an image, and, more particularly, to converting an image taken in a wide-view format into a synthetic representation and using a model to localize objects.

BACKGROUND

Systems use data from sensors to detect and track objects for different tasks. For example, a system processes an image from a camera to identify an object for safety or navigation. Moreover, systems use different cameras such as monocular or wide-view (e.g., fisheye) for capturing scenes from various perspectives. In various implementations, an image from a wide-view camera captures a greater field-of-view (FOV), range, and area of a scene than a monocular image. This benefits applications demanding wider coverage of scenes to detect objects. However, a system encounters difficulties detecting objects from a wide-view format due to distortion in the image at faraway areas.

In one approach, systems use multiple cameras to correct distortion in wide-view formats by stitching multiple views. However, these systems increase computational cost and complexity. Furthermore, some precision for localizing objects within a wide-view image is lost once a system performs stitching of images. As such, the lost precision makes the wide-view format incompatible for sensitive applications having thresholds for precision and accuracy (e.g., automated driving).

SUMMARY

In one embodiment, example systems and methods relate to a manner of detecting and localizing objects within an image in a wide-view format using a synthetic representation. In various implementations, systems detecting objects in a wide-view format encounter difficulties due to distortion or lost definition when correcting distortion. For example, the increased range and field-of-view (FOV) caught by a fisheye camera cause distortion in the corners of a captured image. Systems that stitch images in wide-view formats from multiple sources to adjust this distortion increase complexity and decrease the precision demanded by sensitive applications. Therefore, in one embodiment, a detection system converts a real image in a wide-view format into a synthetic representation for detecting and localizing objects (e.g., vehicles). A synthetic representation may be a dataset created to reduce the complexity associated with tasks, such as training a model for object detection. As such, the detection system trains models using data from a camera (e.g., wide-view camera) associated with a simulated scene (e.g., traffic intersections) as the ground truths. Otherwise, obtaining real data for a system that makes inferences about an image in a wide-view format can be computationally costly. In this way, the detection system reduces the costs of detecting objects by utilizing a single image during inference and using ground truths of a simulated environment instead of real data for training.

Regarding inference, the detection system uses scaled encoding for feature extraction (e.g., color or style) to generate a simulated scene. Through scaling, the detection system may improve feature representation for smaller objects, in corners, and faraway areas in a distorted view depicted by the synthetic representation. The detection system decodes the features to identify attributes and bounding boxes associated with object localization within the simulated scene. These outputs of the detection system are used for executing further tasks. For example, the detection system compares an object location to geometries of a real scene using a transformation matrix and derives the actual location accordingly. As such, the detection system can generate a map using the actual location for applications such as navigation. Thus, the detection system localizes objects in a simulated scene precisely with decreased computation costs from a single image irrespective of distortion and without complex stitching.

In one embodiment, a detection system for detecting and localizing objects within an image in a wide-view format using a synthetic representation is disclosed. The detection system includes a processor and a memory storing instructions that, when executed by the processor, cause the processor to convert a real image in a wide-view format to a synthetic representation using a style model, wherein the synthetic representation depicts a distorted view of the object. The instructions also include instructions to identify features of the object using an extraction model that distinguishes different scales of the synthetic representation and a simulated scene to define structures associated with the distorted view. The instructions also include instructions to detect the object using a decoder model that identifies an attribute and a bounding box of the object from the features. The instructions also include instructions to execute a task using the attribute and the bounding box to localize the object in the simulated scene.

In one embodiment, a non-transitory computer-readable medium for detecting and localizing objects within an image in a wide-view format using a synthetic representation and including instructions that when executed by a processor cause the processor to perform one or more functions is disclosed. The instructions include instructions to convert a real image in a wide-view format to a synthetic representation using a style model, wherein the synthetic representation depicts a distorted view of an object. The instructions also include instructions to identify features of the object using an extraction model that distinguishes different scales of the synthetic representation and a simulated scene to define structures associated with the distorted view. The instructions also include instructions to detect the object using a decoder model that identifies an attribute and a bounding box of the object from the features. The instructions also include instructions to execute a task using the attribute and the bounding box to localize the object in the simulated scene.

In one embodiment, a method for detecting and localizing objects within an image in a wide-view format using a synthetic representation is disclosed. In one embodiment, the method includes converting a real image in a wide-view format to a synthetic representation using a style model, wherein the synthetic representation depicts a distorted view of an object. The method also includes identifying features of the object using an extraction model that distinguishes different scales of the synthetic representation and a simulated scene to define structures associated with the distorted view. The method also includes detecting the object using a decoder model that identifies an attribute and a bounding box of the object from the features. The method also includes executing a task using the attribute and the bounding box to localize the object in the simulated scene.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
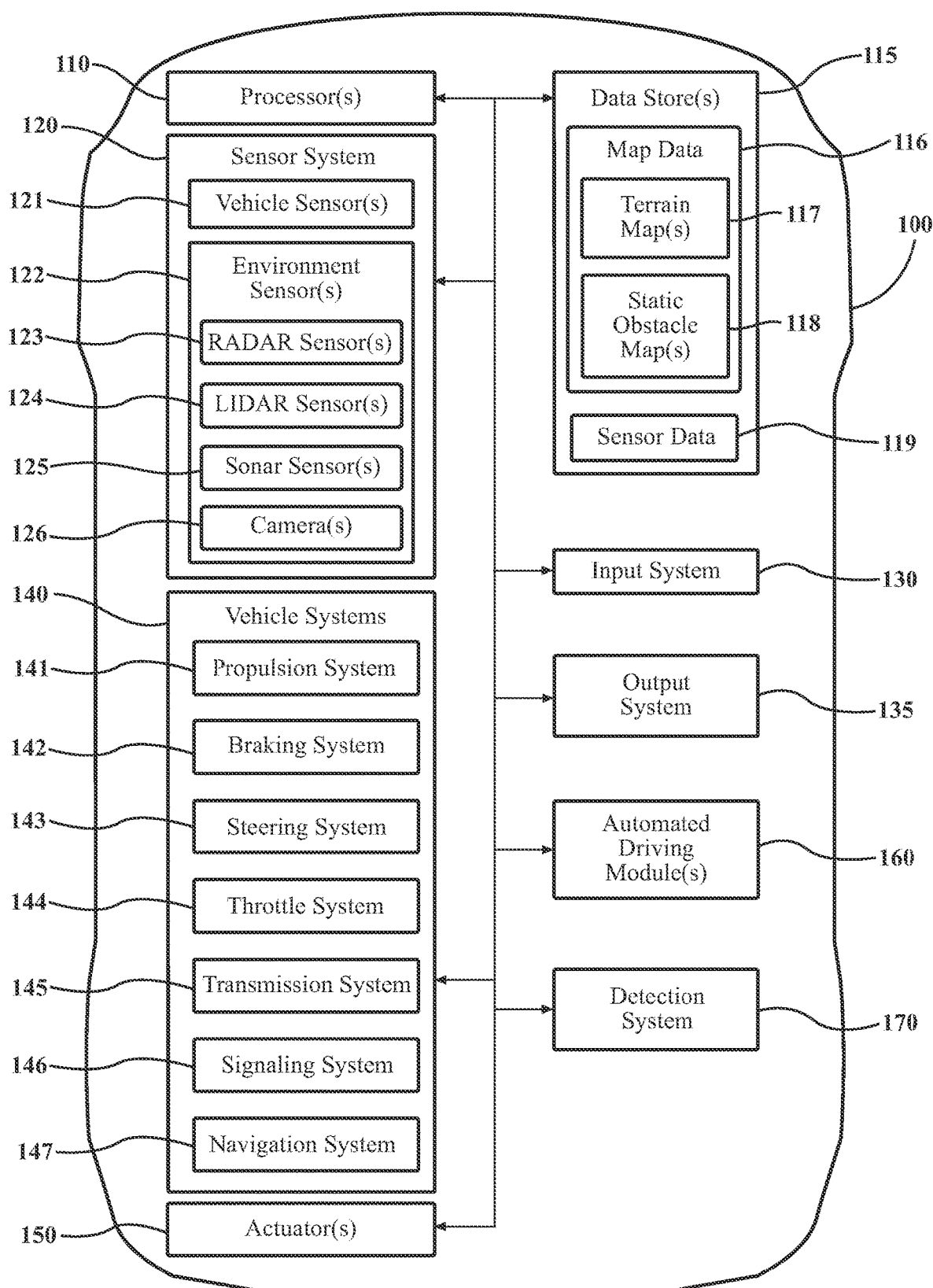
FIG. 1 illustrates one embodiment of a vehicle within which systems and methods disclosed herein may be implemented.

Systems, methods, and other embodiments associated with detecting and localizing objects within an image in a wide-view format using a synthetic representation are disclosed herein. In various implementations, detecting objects within an image having a wide field-of-view (FOV) encounter difficulties due to distortion or lost definition. For example, the increased range and FOV in an image captured by a fisheye camera cause distortion in the corners and faraway areas. Therefore, in one embodiment, a detection system uses a style model for converting an image in a wide-view format of a real scene into a synthetic representation. In one approach, the style model is a generative adversarial network (GAN) (e.g., CycleGAN) that stylizes the wide-view format to enhance definition in corners or faraway areas within the image. Then, the detection system may use a detection and localization model that localizes objects (e.g., vehicles) within the image. In one approach, an extraction model uses a pyramid encoder that extracts features of the synthetic representation at different scales, where each layer of the encoder has a different spatial resolution and semantics. Different scales can improve the definition and structure of the synthetic representation for identifying features and decoding by increasing the representation of smaller objects, corners, and faraway areas of a scene. Accordingly, the extraction model distinguishes different scales of the synthetic representation for improving the feature identification of an object within a simulated scene.

Moreover, the detection system uses a decoder such as a neural network (e.g., a convolutional neural network (CNN)) to decode the features, identify attributes, and identify bounding boxes associated with objects at similar or different scales. The decoder can output an object width (w), height (h), object center coordinates (x, y), and a class (e.g., car or truck) according to the features extracted by the extraction model. In this way, the detection system accurately identifies a bounding box and class of the object in the wide-view format as part of localization in the simulated scene by the detection system.

In various implementations, the detection system executes a task using the decoder outputs for localization. For example, the detection system uses a bounding box of a vehicle to predict movement or generate a visual. In particular, the detection system may use a synthetic location and an actual location to generate a high-definition (HD) map. Here, the bounding box can represent a synthetic location (e.g., pixel values) of an object in the simulated scene. As such, the detection system compares the synthetic location to geometries of the real scene using a transformation matrix that derives an actual location of the object and generates the HD map. In one approach, the transformation matrix outputs the orientation and position of the object in a real-world scene using the synthetic location. Accordingly, the detection system detects objects in a wide-view format accurately and efficiently using the synthetic representation and scaling, thereby improving scene definition and structure for performing sensitive tasks or generating visuals.

Now referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the detection system uses roadside units (RSU), consumer electronics (CE), mobile devices, robots, drones, and so on that benefit from the functionality discussed herein associated with detecting and localizing objects within an image in a wide-view format using a synthetic representation. In the forthcoming examples, an image is taken by a wide-view camera, a fisheye camera, a specialized camera, and so on in a wide-view format. In either case, the camera may distort the image due to the increased range and coverage of a scene. Thus, a detection system can process the image to correct distortions and more accurately detect objects.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a detection system 170 that is implemented to perform methods and other functions as disclosed herein relating to detecting and localizing objects within an image in a wide-view format using a synthetic representation. As will be discussed in greater detail subsequently, the detection system 170, in various embodiments, is implemented partially within the vehicle 100. For example, in one approach, functionality associated with at least one module of the detection system 170 is implemented within the vehicle 100 while further functionality is implemented within a cloud-based computing system.

Figure 2:
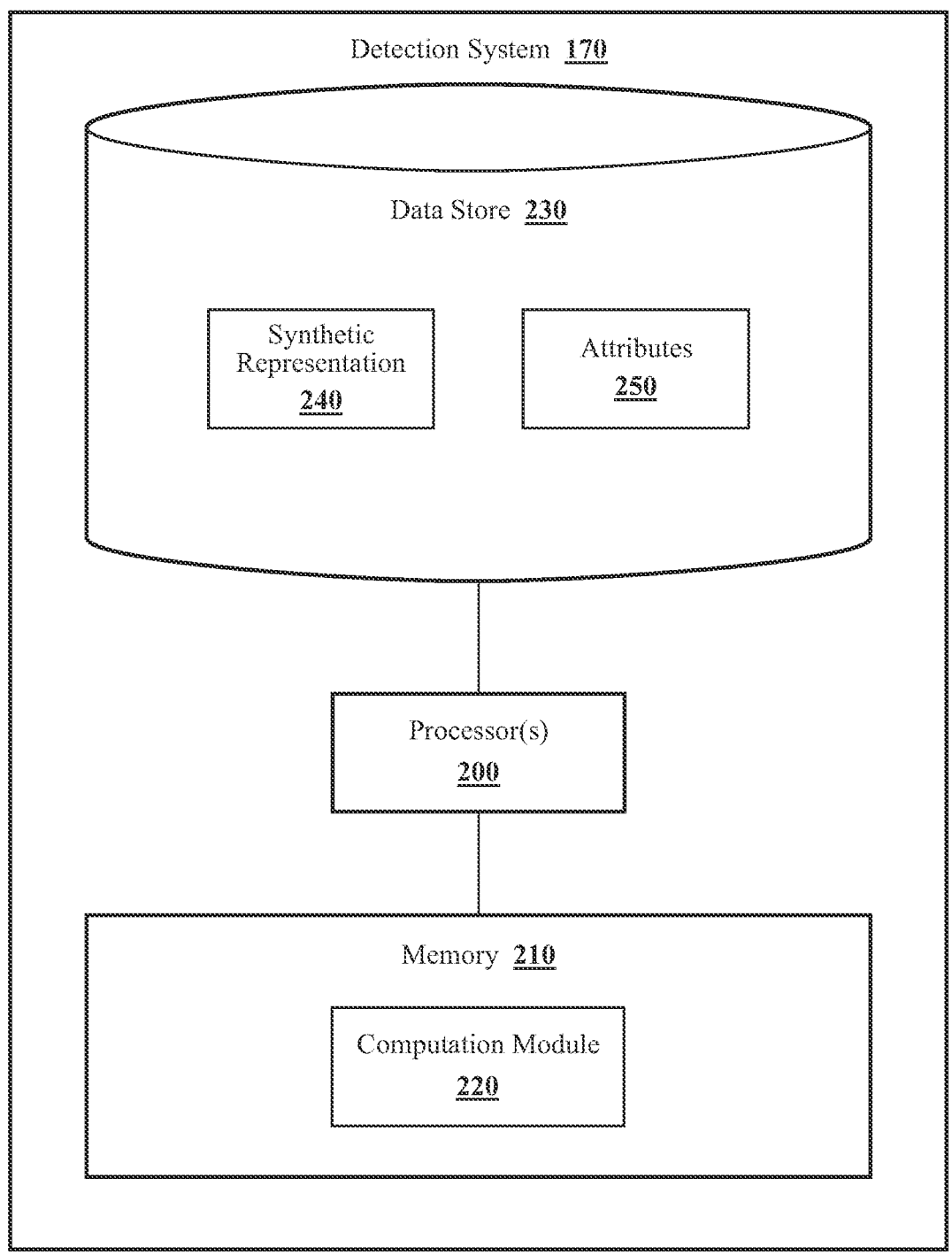
FIG. 2 illustrates one embodiment of a detection system that is associated with using stylization and modeling to detect and localize objects within an image in a wide-view format.

With reference to FIG. 2, one embodiment of the detection system 170 of FIG. 1 is further illustrated. The detection system 170 is shown as including a processor 200. In one embodiment, the detection system 170 includes a memory 210 that stores a computation module 220. The memory 210 is a random-access memory (RAM), read-only memory (ROM), a hard-disk drive, a flash memory, or other suitable memory for storing the computation module 220. The computation module 220 is, for example, computer-readable instructions that when executed by the processor 200 cause the processor 200 to perform the various functions disclosed herein.

The computation module 220 generally includes instructions that function to control the processor 200 to receive data inputs from one or more sensors. In one approach, the sensors are part of the vehicle 100. As provided for herein, the computation module 220, in one embodiment, acquires images from a wide-view camera that captures an increased range and area of a scene. The scene capture may be similar to a distorted panorama of a real scene. Besides a camera, the computation module 220 acquires data from further sensors such as radar sensors 123, LIDAR sensors 124, and other sensors as may be suitable for identifying vehicles and locations of the vehicles within an image. Moreover, the computation module 220 can undertake various approaches to fuse data from the multiple sensors for detecting and localizing objects within an image in a wide-view format.

Moreover, in one embodiment, the detection system 170 includes a data store 230. In one embodiment, the data store 230 is a database. The database is, in one embodiment, an electronic data structure stored in the memory 210 or another data store and that is configured with routines that can be executed by the processor 200 for analyzing stored data, providing stored data, organizing stored data, and so on. Thus, in one embodiment, the data store 230 stores data used by the computation module 220 in executing various functions. As explained below, the data store 230 includes the synthetic representation 240. Here, the synthetic representation 240 may be a synthetic version of a real image captured by a wide-view camera (e.g., fisheye camera). For example, the synthetic representation 240 is a dataset created to reduce the complexity associated with tasks, such as object detection.

In addition to the synthetic representation 240, the data store 230 also includes the attributes 250 associated with objects (e.g., vehicles) within the synthetic representation 240. Examples of the attributes 250 are object width (w), height (h), center coordinates (x, y), and classes (e.g., a pedestrian, a car, or a truck). In one approach, the detection system 170 utilizes the attributes 250 to generate a bounding box around an object within the synthetic representation 240 in a simulated scene.

Regarding module details, the computation module 220 may include instructions that cause the processor 200 to use different scales of the synthetic representation 240 for detecting and localizing objects. As explained below, the detection system 170 uses different scales in an extraction model for improving the definition and structure of the synthetic representation 240. This can improve the feature identification within the synthetic representation 240, particularly at the corners, for subsequent tasks. In one approach, the corners are faraway areas of a scene having less definition or more blurring. As such, the extraction model uses different scales of the synthetic representation 240 to improve the feature identification of an object within the simulated scene.

Figure 3:
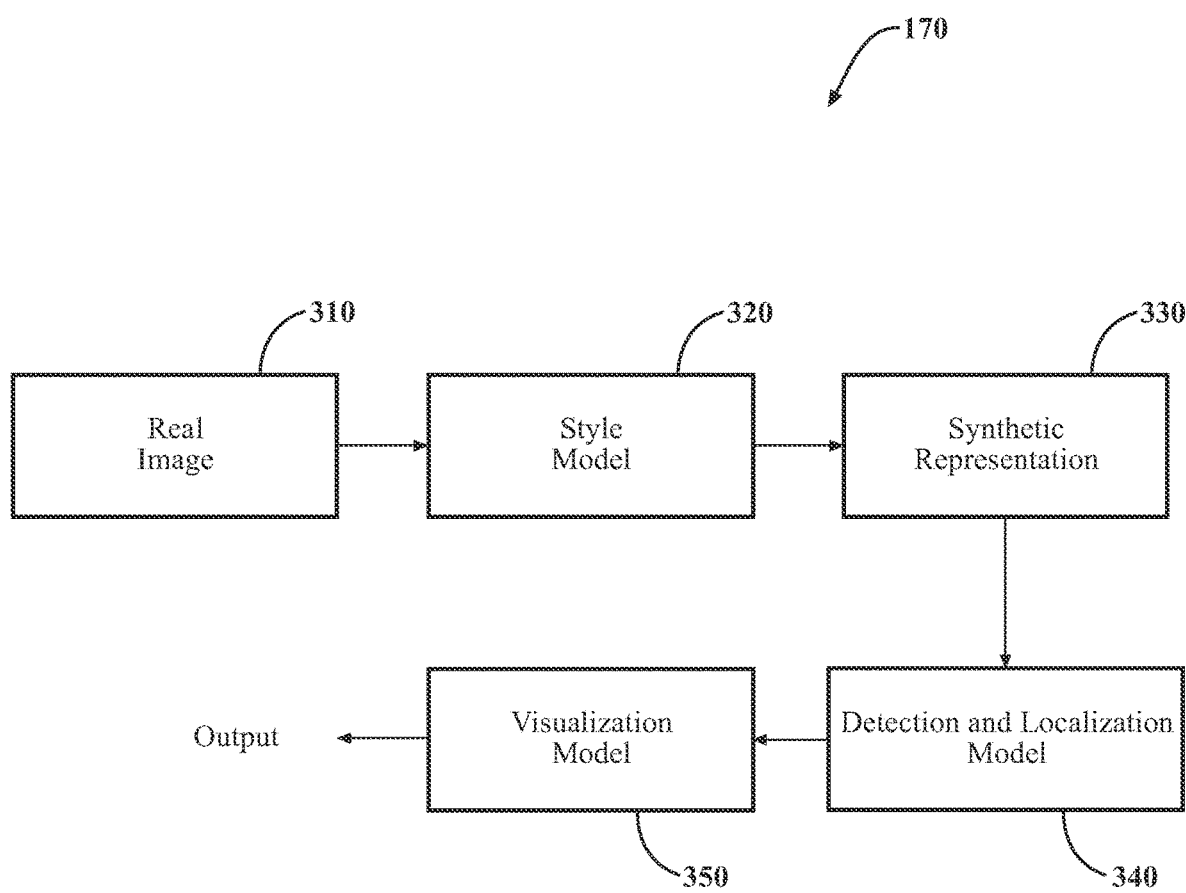
FIG. 3 illustrates one embodiment of the detection system of FIG. 2 using a processing pipeline to detect and localize objects within an image in a wide-view format and generate a simulated scene.

FIG. 3 illustrates one embodiment of the detection system 170 of FIG. 2 using a processing pipeline to detect and localize objects within an image in a wide-view format. A real image 310 is captured by a wide-view camera and processed by a style model 320. Here, the computation module 220 uses the style model 320 to distinguish content and style by converting the real image 310 into a synthetic representation 330. This conversion simplifies tasks for object detection while maintaining a wide-view format by identifying features of a real scene in the synthetic domain. In one approach, the synthetic representation is a simulated scene of the real image 310 and the detection system uses the simulated scene to localize an object as explained below.

Furthermore, the detection and localization model 340 may distinguish objects within the synthetic representation 330 in part by extracting and decoding features. To do so, the detection system 170 can train the detection and localization model 340 using data from a camera (e.g., wide-view camera) associated with a simulated environment (e.g., traffic intersections) as the ground truths. Obtaining real data for a system that makes inferences of an image in a wide-view format can be computationally costly. In particular, traffic data for an intersection can be costly due to varying configurations and geographic layouts. For example, the detection system 170 desires images from a RSU (i.e., fixed camera) for training. The availability of such real data can be limited. However, a simulator generates accurate ground truth data readily. Accordingly, the detection system 170 reduces computational costs of detecting objects in a wide-view format during inference using ground truth data from a simulated environment instead of real data. In addition, a simulator may readily provide annotated data for various environments, such as RSUs (e.g., wide-view camera) in the synthetic domain. Accuracy may also improve when relying on robust simulations instead of real data for training a model that processes distorted synthetic representations since faraway areas have more definition.

Furthermore, the detection and localization model 340 can use an extraction model that forms different scales of the synthetic representation 240 and a simulated scene to identify and distinguish features. For example, the extraction model is a pyramid encoder that captures the structure of an image in a wide-view format through scaling. A pyramid encoder can extract features of the synthetic representation 240 at different scales, where each layer of the encoder has a different spatial resolution and semantics. Different scales can improve the definition and structure of the synthetic representation 240 for tasks such as identifying features and decoding. In particular, this can improve representation within the synthetic representation 240 of smaller objects or corners where definition varies with spatial resolution. In a wide-view format, the corners are faraway areas of a scene having less definition or more blurring. Scaling of the synthetic representation 240 can improve the definition in these corners.

For decoding at the detection and localization model 340, the detection system 170 may use a neural network (e.g., a convolutional neural network (CNN)). The neural network may decode and detect an object by using extracted features from the encoder. Here, the decoder identifies an attribute and a bounding box of the object as outputs. The detection system 170 executes localization in the simulated scene by identifying these attributes.

In one approach, the detection system 170 uses the outputted attribute and the bounding box to execute a task (e.g., navigation) in the simulated scene. The bounding box may represent a synthetic or virtual location of an object in the simulated scene. For example, the synthetic location is represented by pixel values of the simulated scene. The detection system 170 compares the synthetic location to geometries of the real scene using a transformation matrix and detects an actual location of the object accordingly. Through the transformation matrix, the detection system 170 maps objects between different coordinate systems. In other words, computations using the transformation matrix can output the orientation and position of the object in a real-world scene using the synthetic or virtual location.

Moreover, the visualization module 350 can generate or render a map using the actual location. For example, the map is an HD or three-dimensional (3D) map showing vehicles positioned at a traffic intersection. To improve accuracy, the visualization module 350 can also render the map using the attribute and the bounding box from a prior location of the object. In various implementations, the detection system 170 derives the transformation matrix according to images taken by a camera in a fixed position for RSU applications.

In various implementations, the detection and localization model 340 is trained in a simulated environment by the detection system 170. In other words, the training dataset is synthetically generated. Due to dataset bias, a model trained on a specific dataset may not generalize well to other datasets. As such, the distance and position information of an object (e.g., vehicles) outputted by the detection and localization model 340 is more accurate than real data through using robust synthetic data of various scenes and environments. Regarding domain variation, the detection system 170 can fine-tune the detection and localization model 340 through fitting numerous parameters. However, the detection system 170 uses the style model 320 to convert the real image 310 into a synthetic representation 330 and minimize the complexity and cost associated with fine-tuning parameters. In this way, the operation is efficiently improved by minimizing the distance and distributions between the source and target feature.

Figure 4:
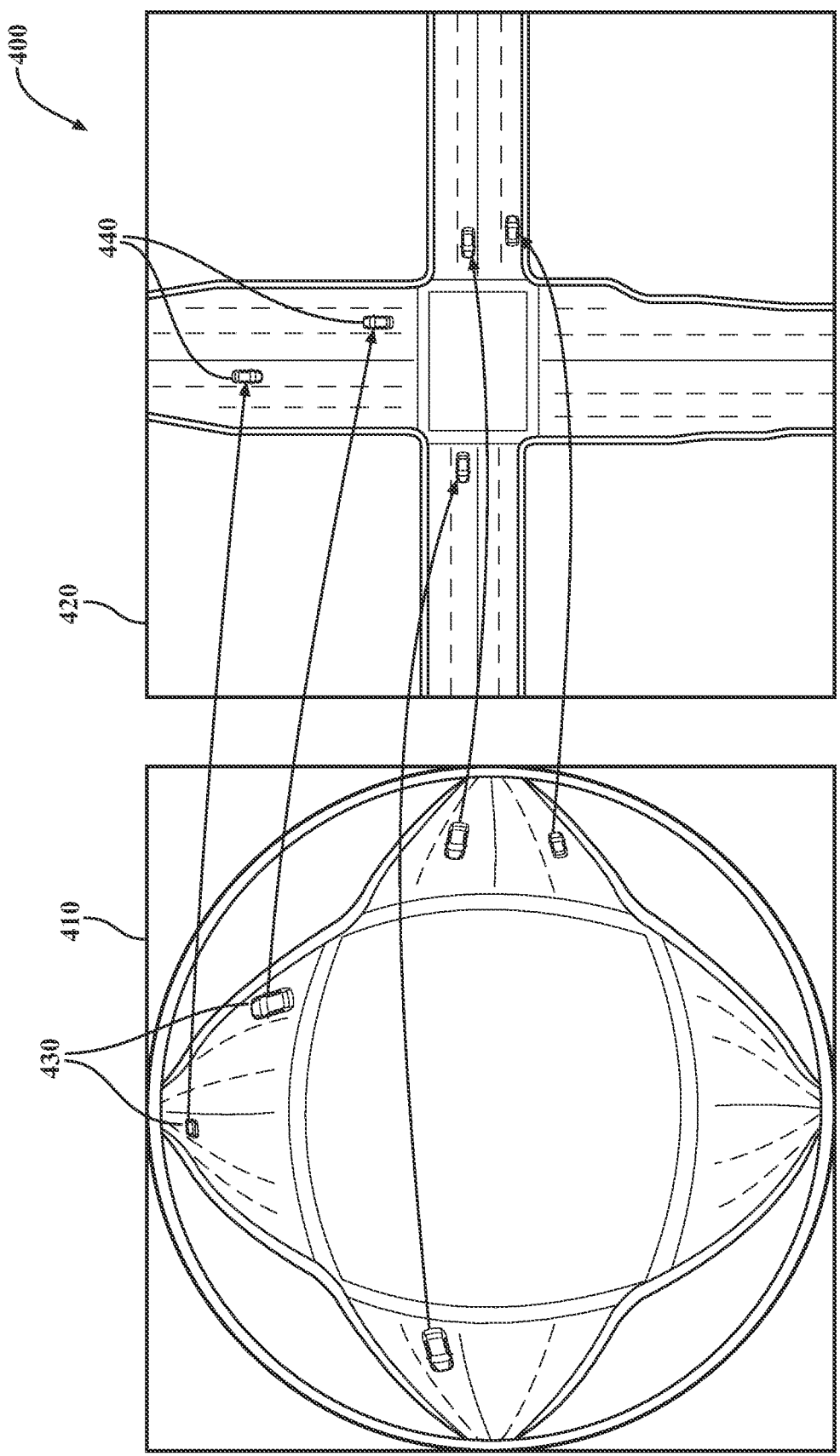
FIG. 4 illustrates an example of detecting and localizing objects, within a synthetic representation of a real intersection, using a simulated scene.

Turning now to FIG. 4, the example 400 illustrates detecting and localizing objects, within a synthetic representation of a real intersection, using a simulated scene. Here, a fisheye image from the real-world of an intersection is converted to the synthetic domain as representation 410 using the style model 320. The image is also processed by the detection system 170 to have similar road geometry as the simulated scene 420 through the detection and localization model 340. Accordingly, the detection system 170 reduces computations and increases the accuracy of detecting distorted objects within an image in a wide-view format by using the road geometries of the simulated scene 420 instead of a real map.

In one example, the style model 320 is a generative adversarial network (GAN) (e.g., RecycleGAN, CycleGAN, MUNIT, etc.) that encodes an input image to generate content code and style code. A decoder then decodes the content code and the style code for reconstructing a synthetic image stylized to minimize the differences between the source and target features. As a result, the vehicles 430 represented as darker objects have increased definition for localization and other tasks after processing by the style model 320. For instance, the detection system 170 generates the simulated scene 420 with the virtual vehicles 440 at a real intersection more accurately using the representation 410 of the fisheye image.

Figure 5:
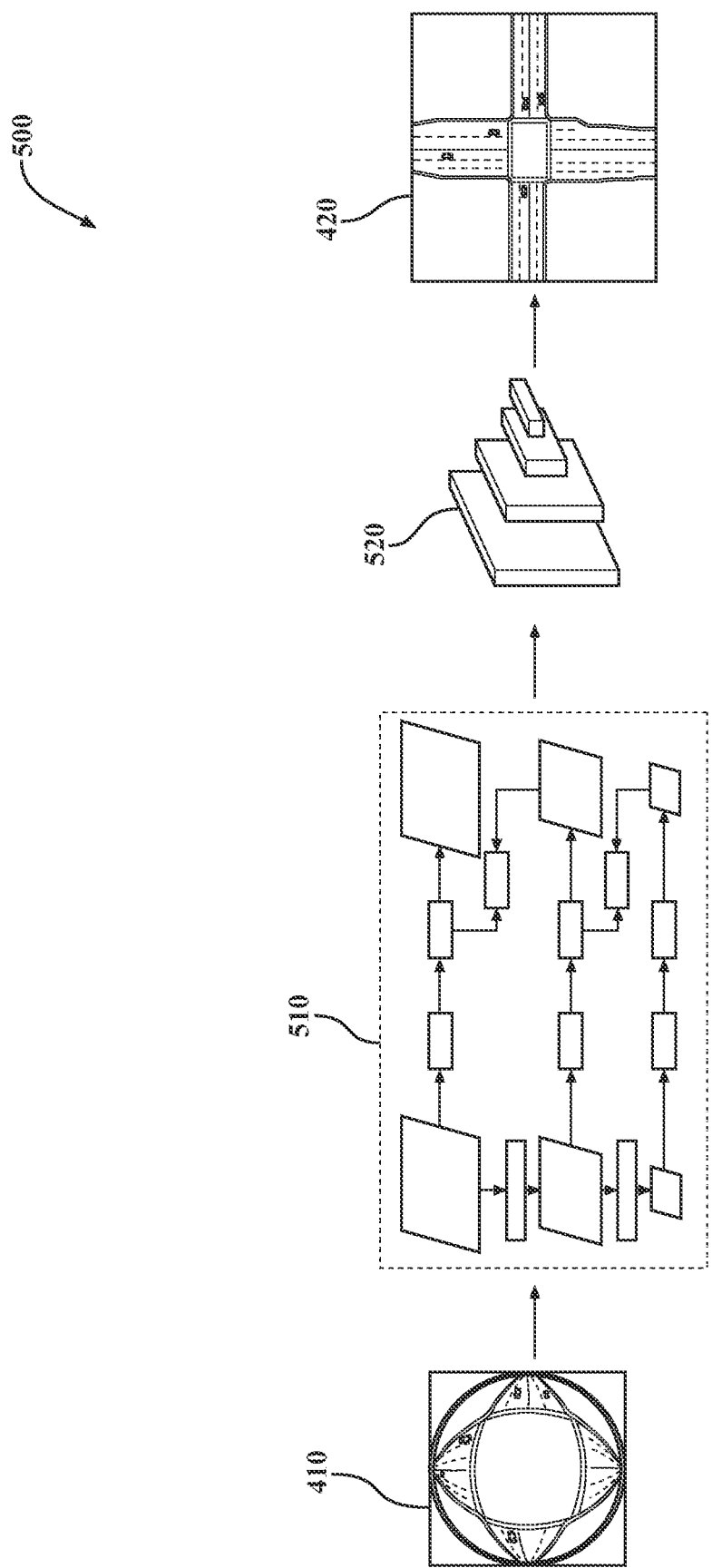
FIG. 5 illustrates one embodiment of the detection system using encoder and decoder models to detect and localize objects within an image in a wide-view format.

In FIG. 5, one embodiment of the detection system 170 using encoder and decoder models 500 to detect and localize objects within an image in a wide-view format is illustrated. Here, the detection system 170 uses a deep learning model with multi-scale feature encoding to detect objects (e.g., vehicles) on the road directly from a wide-view format. In particular, the detection system 170 detects bounding boxes of objects within a single image without complex stitching or other tasks using the detection and localization model 340.

As explained previously, the detection system 170, in various arrangements, trains the detection and localization model 340 using synthetic data having labeled data preexisting. In this way, the detection system 170 trains without relying on ground truth data of a real intersection, thereby reducing computational complexity and costs. For example, the detection system 170 acquires from a simulator a training dataset of synthetic representations associated with an image from simulated intersections. In the training dataset, the label for a ground truth is the bounding box of each vehicle on the road directly outputted from a simulator. Determining such ground truths by the detection system 170 is otherwise computationally costly using a realistic dataset for labeling, particularly for unique traffic intersections.

Moreover, the detection system 170 may train the encoder 510 or the decoder 520 using Equations (1)-(5) to calculate losses. Here, the loss function $\mathcal{L}_{total}$ is a combination of sub-losses including the center coordinates loss ($\mathcal{L}_{xy}$), width/height loss ($\mathcal{L}_{wh}$), confidence loss ($\mathcal{L}_{obj}$), and class loss ($\mathcal{L}_{class}$) associated with an object. Also, B represents bounding boxes each cell i can predict, $S^2$ represents the cells in the feature map, and $\lambda$ (e.g., 1) is a constant term.

$$\mathcal{L}_{xy} = \lambda_{coord} \sum_{k=0}^{S^2} \sum_{j=0}^{B} I_{ij}^{obj} \left[ (x_i - \hat{x}_i)^2 + (y_i - \hat{y}_i)^2 \right] \quad \text{Equation (1)}$$

$$\mathcal{L}_{wh} = \lambda_{coord} \sum_{k=0}^{S^2} \sum_{j=0}^{B} I_{ij}^{obj} \left[ (\sqrt{w_i} - \sqrt{\hat{w}_i})^2 + (\sqrt{h_i} - \sqrt{\hat{h}_i})^2 \right] \quad \text{Equation (2)}$$

$$\mathcal{L}_{obj} = -\sum_{k=0}^{S^2} \sum_{j=0}^{B} \left[ C_i \log(\hat{C}_i) \right] \quad \text{Equation (3)}$$

-continued $$\mathcal{L}_{class} = -\sum_{k=0}^{S^2} I_{ij}^{obj} \sum_{c=classes} [c_{i,j} \log(p(\hat{c}_{i,j}))] \quad \text{Equation (4)}$$

$$\mathcal{L}_{total} = \mathcal{L}_{xy} + \mathcal{L}_{wh} + \mathcal{L}_{obj} + \mathcal{L}_{class} \quad \text{Equation (5)}$$

Furthermore, in Equations (1)-(5) $1_{ij}^{obh}$ may have a value of 1 when there is an object in box j of cell i within a simulated scene and a value of 0 otherwise. The coordinates (x, y) represent the actual center coordinates and ($\hat{x}_i$, $\hat{y}_i$) are the estimates in cell i. Similarly, w is the actual wide and $\hat{w}_i$ the estimate in cell i. Also, parameter h is the actual height, whereas $h_i$ the estimate in cell i.

Regarding other parameters, $C_i$ is the box confidence score representing the existence of an object in cell i using $\hat{C}_i$ as the ground truth (e.g., 0 or 1). Equation (4) calculates $\mathcal{L}_{class}$ as the classification loss at each cell i when an object is detected. For a class c in all classes, $c_{i,j}$ may represent whether the detected object belongs to a class or not, based on a ground truth, and $p(\hat{c}_{i,j})$ is the possibility that the detected object belongs to the class, based on a detection and localization model 340 output.

Regarding inference operations, the encoder and decoder models, in at least one configuration, use stylized representations of images in a wide-view format from a real-world scene. As such, the input to the detection and localization model 340 may be the representation 410 from the synthetic domain. In various implementations, the output is an accurate bounding box of each object, such as a vehicle on a road. In particular, the encoder 510 may be a feature extractor using a pyramid model that captures global and local features. The decoder 520 may be a neural network (e.g., a convolutional neural network (CNN)) that outputs an object width (w), height (h), and center coordinates (x, y). In one approach, the detection system 170 uses the encoder 510 and the decoder 520 to locate objects within distorted images in a wide-view format from RSU or fixed-position cameras. For example, the detection system 170 processes faraway areas or corners of the image to reduce distortion for accurately extracting features and detecting vehicles. Accordingly, the detection and localization model 340 generates the simulated scene 420 having the virtual vehicles 440 accurately localized by adjusting for distortion.

Figure 6:
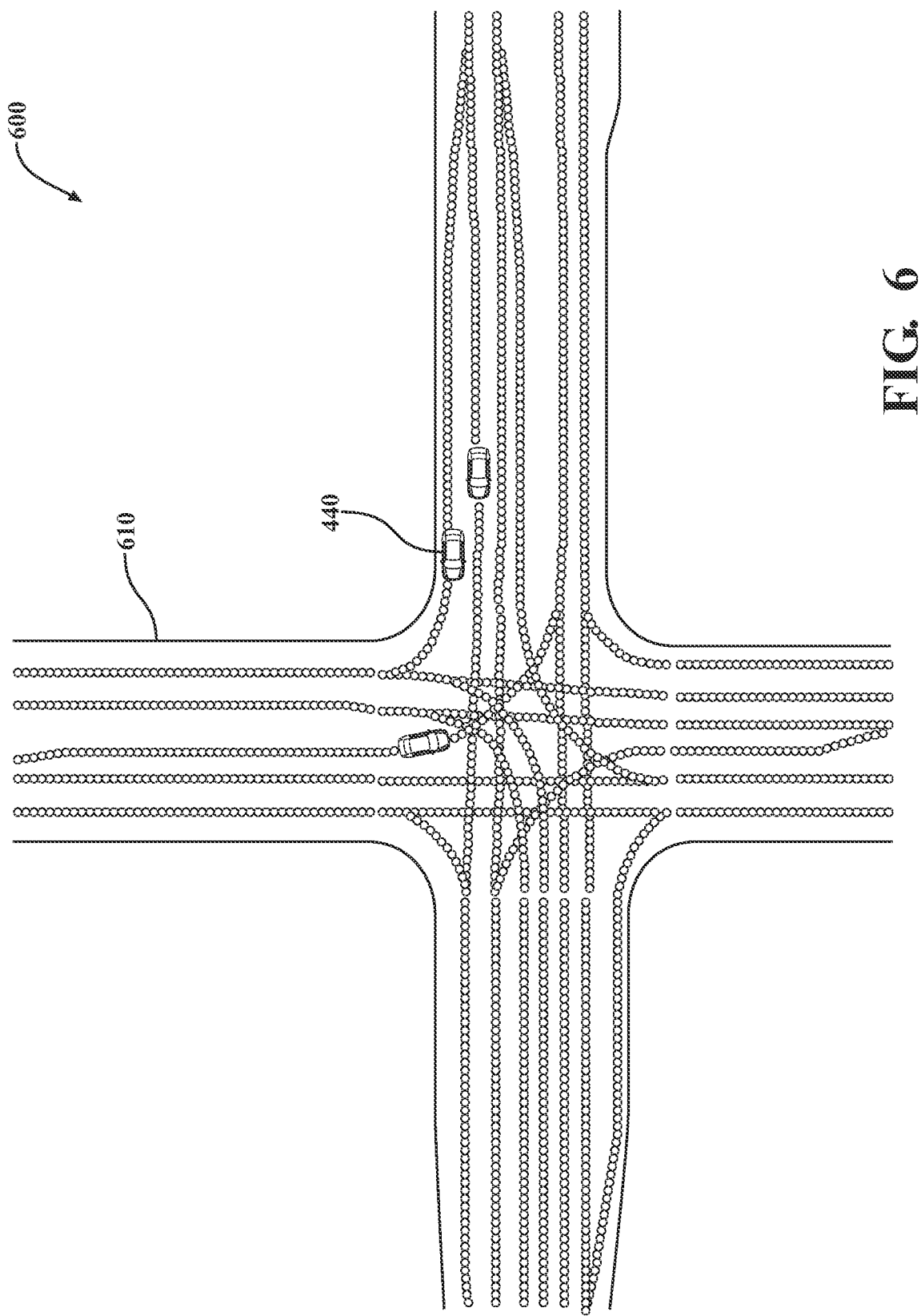
FIG. 6 illustrates an example of the detection system generating a virtual scene using attributes of detected objects on a map.

Returning to FIG. 3, the visualization module 350 may generate a scene using bounding boxes and classes (e.g., car, truck, or pedestrian) of detected vehicles on a simulated road from the detection and localization model 340. FIG. 6 illustrates an example of the detection system 170 generating a scene 600 using attributes of detected objects on a map. Here, the scene may be used for further tasks such as motion planning, navigation, traffic planning, and so on by the vehicle 100. In one approach, the visualization module 350 uses a synthetic location and an actual location from previous detection tasks to generate a visual 610 as an HD or 3D map.

As explained previously, the bounding box may represent a synthetic or virtual location of an object in a simulated scene. For example, the synthetic location is represented by pixel values of the simulated scene. The detection system 170 can compare the synthetic location to geometries of the real scene using a transformation matrix that derives an actual location of the object and generate the visual 610 using the visualization module 350. Computations involving the transformation matrix can output the orientation and position of the object in a real-world scene using the synthetic location. In this way, the visualization module 350 renders a map using the actual location.

In various implementations, the visualization module 350 uses the distance information from a detected vehicle to a camera of a RSU and the RSU location for obtaining real coordinates. In particular, the visualization module 350 uses a series of coordinate transformations for the computation. As such, the visual 610 can show the virtual vehicle 440 using vehicle states, predicted movement, and so on associated with information from the detection and localization model 340.

As an additional enhancement, the detection system 170 may capture an image in a wide-view format using the camera(s) 126. Furthermore, the detection and localization model 340 and the visualization module 350 are implemented on the vehicle 100 to generate the visual 610. Here, the image in the wide-view format is distorted due to the motion of the vehicle 100. To adjust for motion-related distortion, especially in faraway areas within the image, the detection and localization model 340 uses changing real-world coordinates (e.g., GPS) of the camera(s) 126 for the transformation matrix. In this way, the detection system 170 detects objects while moving using the detection and localization model 340 following the examples given herein.

Figure 7:
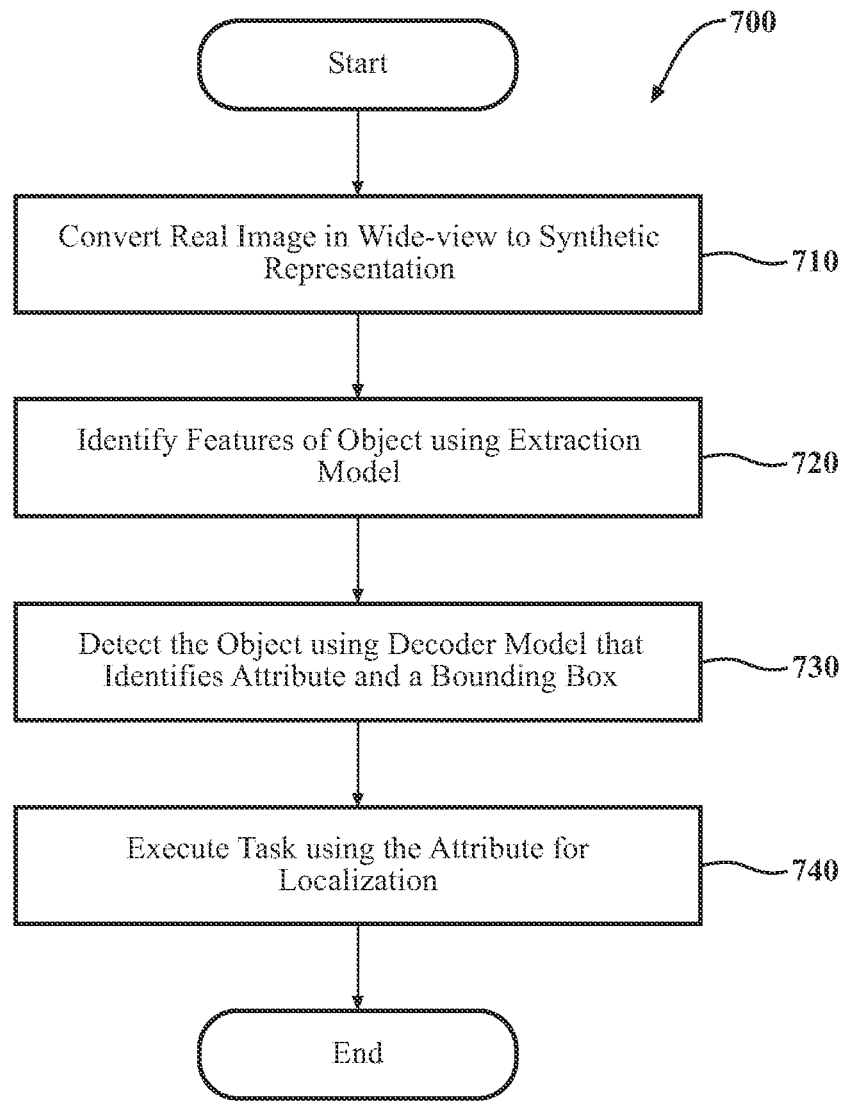
FIG. 7 illustrates one embodiment of a method that is associated with detecting and localizing objects within an image in a wide-view format of a real scene using modeling.

Turning now to processing by the detection system 170, FIG. 7 illustrates a flowchart of a method 700 that is associated with detecting and localizing objects within an image in a wide-view format using modeling. Method 700 will be discussed from the perspective of the detection system 170 of FIGS. 1 and 2. While method 700 is discussed in combination with the detection system 170, it should be appreciated that the method 700 is not limited to being implemented within the detection system 170 but is instead one example of a system that may implement the method 700.

As explained previously, at 710 the detection system 170 converts a real image of a scene in a wide-view format taken by a camera to a synthetic representation. For instance, the camera is a fisheye camera of a RSU. The conversion to a synthetic representation is executed using a style model. In one approach, the style model is a generative adversarial network (GAN) (e.g., RecycleGAN, CycleGAN, MUNIT, etc.) that encodes the real image to generate content code and style code. A decoder then decodes the content code and the style code for reconstructing a synthetic image stylized to minimize the differences between the source and target features. As a result, objects within the real image in a wide-view format have enhanced definition for further tasks after processing by the style model.

At 720, the detection system 170 identifies features of an object within the synthetic representation using an extraction model. For instance, the detection and localization model 340 uses an encoder that extracts global and local features of a darker object within the synthetic representation. Here, the darker object may be a vehicle at an intersection that the detection system 170 is tracking. In one approach, the extraction model is a pyramid encoder that captures the structure of a wide-view format through scaling. For example, a pyramid encoder can extract features of the synthetic representation at different scales. In particular, each layer of the encoder has a different spatial resolution and semantics. Different scales can improve the definition and structure of objects within the synthetic representation for feature extraction. This can improve tasks such as identifying features and improving decoding. For instance, the extraction model can increase the definition of the synthetic representation at the corners. In the wide-view format, the corners are faraway areas of a scene having less definition or more blurring. Accordingly, the extraction model uses different scales of the synthetic representation for improving the feature identification of an object within a simulated scene.

In various implementations, the detection system 170 trains the detection and localization model 340 using data from a camera (e.g., wide-view camera) associated with a simulated environment (e.g., traffic intersections) as the ground truths. As explained previously, obtaining real data for a system that makes inferences of an image in a wide-view format can be computationally costly for varying environments. For example, the detection system 170 needs images from a RSU (i.e., fixed camera) for training. The availability of such real data can be limited. However, a simulator generates accurate ground truth data readily. Accordingly, the detection system 170 reduces the costs of detecting objects in a wide-view format during inferences using ground truth data from a simulated environment instead of real data.

At 730, the detection system 170 detects the object using a decoder model that identifies attributes and a bounding box. As explained previously, the detection and localization model 340 may use a decoder that identifies the attributes using a neural network (e.g., a convolutional neural network (CNN)). The CNN can output an object width (w), height (h), object center coordinates (x, y), and a class (e.g., car, truck, or pedestrian) according to the features extracted by the extraction model. Accordingly, the decoder identifies an attribute, a class, and a bounding box of the object as outputs, thereby executing localization in the simulated scene.

At 740, the detection system 170 executes a task using the attribute for localization. For example, the detection system 170 uses a bounding box of a vehicle or a class to predict movement or generate a visual. In particular, the detection system 170 may use a synthetic location and an actual location from previous detection tasks to generate a visual as an HD or 3D map. As explained previously, the bounding box may represent a synthetic or virtual location (e.g., pixel values) of an object in the simulated scene. The detection system 170 compares the synthetic location to geometries of the real scene using a transformation matrix that derives the actual location of the object and generates the visual. In particular, the transformation matrix outputs the orientation and position of the object in a real-world scene using the synthetic location. In this way, the detection system 170 can render a map using the actual location.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be wide-view cameras, fisheye cameras, high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the detection system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140 and, thus, may be partially or fully autonomous as defined by the society of automotive engineers (SAE) levels 0 to 5.

The processor(s) 110, the detection system 170, and/or the automated driving module(s) 160 can be operatively connected to communicate with the various vehicle systems 140 and/or individual components thereof. For example, returning to FIG. 1, the processor(s) 110, the detection system 170, and/or the automated driving module(s) 160 can be in communication to send and/or receive information from the various vehicle systems 140 to control the movement of the vehicle 100. The processor(s) 110, the detection system 170, and/or the automated driving module(s) 160 may control some or all of the vehicle systems 140.

The processor(s) 110, the detection system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the detection system 170, and/or the automated driving module(s) 160 can control the direction and/or speed of the vehicle 100. The processor(s) 110, the detection system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-7 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for locating an object, comprising:
a processor; and
a memory storing instructions that, when executed by the processor, cause the processor to:
convert a real image in a wide-view format to a synthetic representation using a style model, wherein the synthetic representation depicts a distorted view of the object;
identify features of the object using an extraction model that distinguishes different scales of the synthetic representation and a simulated scene to define structures associated with the distorted view;
detect the object using a decoder model that identifies an attribute and a bounding box of the object from the features; and
execute a task using the attribute and the bounding box to localize the object in the simulated scene.

2. The detection system of claim 1, further including instructions to:
output by the decoder model a synthetic location of the object in the simulated scene, wherein the synthetic location is represented by pixels; and
compare the synthetic location to geometries of the real image using a transformation matrix to derive an actual location and generate a map for visualizing the actual location.

3. The detection system of claim 2, further including instructions to generate the map using the attribute, the bounding box, and feature predictions from a prior location of the object.

4. The detection system of claim 2, further including instructions to derive the transformation matrix according to the real image being taken by a camera in a fixed position.

5. The detection system of claim 1, further including instructions to train the style model using a simulated environment having simulated images from a camera in a fixed position as ground truths, wherein the simulated images are in the wide-view format and distorted.

6. The detection system of claim 1, further including instructions to:
localize the object by a class that labels by type; and
generate a map having the object on a road that is simulated using the bounding box and the class.

7. The detection system of claim 1, wherein the extraction model is a pyramid encoder and the decoder model is a neural network.

8. The detection system of claim 1, wherein the task is one of navigating and automating a device.

9. A non-transitory computer-readable medium for locating an object, comprising:
instructions that when executed by a processor cause the processor to:
convert a real image in a wide-view format to a synthetic representation using a style model, wherein the synthetic representation depicts a distorted view of the object;
identify features of the object using an extraction model that distinguishes different scales of the synthetic representation and a simulated scene to define structures associated with the distorted view;
detect the object using a decoder model that identifies an attribute and a bounding box of the object from the features; and
execute a task using the attribute and the bounding box to localize the object in the simulated scene.

10. The non-transitory computer-readable medium of claim 9, further including instructions to:
output by the decoder model a synthetic location of the object in the simulated scene, wherein the synthetic location is represented by pixels; and
compare the synthetic location to geometries of the real image using a transformation matrix to derive an actual location and generate a map for visualizing the actual location.

11. The non-transitory computer-readable medium of claim 10, further including instructions to generate the map using the attribute, the bounding box, and feature predictions from a prior location of the object.

12. The non-transitory computer-readable medium of claim 10, further including instructions to derive the transformation matrix according to the real image being taken by a camera in a fixed position.

13. A method comprising:
converting a real image in a wide-view format to a synthetic representation using a style model, wherein the synthetic representation depicts a distorted view of an object;
identifying features of the object using an extraction model that distinguishes different scales of the synthetic representation and a simulated scene to define structures associated with the distorted view;
detecting the object using a decoder model that identifies an attribute and a bounding box of the object from the features; and
executing a task using the attribute and the bounding box to localize the object in the simulated scene.

14. The method of claim 13, further comprising:
outputting by the decoder model a synthetic location of the object in the simulated scene, wherein the synthetic location is represented by pixels; and
comparing the synthetic location to geometries of the real image using a transformation matrix to derive an actual location and generating a map for visualizing the actual location.

15. The method of claim 14, further comprising generating the map using the attribute, the bounding box, and feature predictions from a prior location of the object.

16. The method of claim 14, further comprising deriving the transformation matrix according to the real image being taken by a camera in a fixed position.

17. The method of claim 13, further comprising training the style model using a simulated environment having simulated images from a camera in a fixed position as ground truths, wherein the simulated images are in the wide-view format and distorted.

18. The method of claim 13, further comprising:
localizing the object by a class that labels by type; and
generating a map having the object on a road that is simulated using the bounding box and the class.

19. The method of claim 13, wherein the extraction model is a pyramid encoder and the decoder model is a neural network.

20. The method of claim 13, wherein the task is one of navigating and automating a device.

* * * * *